May 18, 1943 E. F. NELSON Re. 22,317

STUD WELDER

Original Filed May 31, 1940 3 Sheets-Sheet 1

INVENTOR
Edward F. Nelson
BY Charles B. Evans
his ATTORNEY

May 18, 1943 E. F. NELSON Re. 22,317

STUD WELDER

Original Filed May 31, 1940 3 Sheets-Sheet 2

INVENTOR
Edward F. Nelson
BY Charles S. Evarts
his ATTORNEY

May 18, 1943 E. F. NELSON Re. 22,317

STUD WELDER

Original Filed May 31, 1940 3 Sheets-Sheet 3

INVENTOR
Edward F. Nelson
BY Charles S. Evans
his ATTORNEY

Reissued May 18, 1943 Re. 22,317

UNITED STATES PATENT OFFICE 22,317

STUD WELDER

Edward F. Nelson, Vallejo, Calif.

Original No. 2,287,818, dated June 30, 1942, Serial No. 338,179, May 31, 1940. Application for reissue June 30, 1942, Serial No. 449,200

23 Claims. (Cl. 219—4)

This invention relates to mechanism for effecting electric butt-welds between metallic objects.

The disclosure of invention herein embodies improvements over the structures of my prior Patent No. 2,191,494, issued Feb. 27, 1940, for Stud welders, and my prior Patent No. 2,217,964, issued Oct. 15, 1940, for Stud welder.

It is an object of the present invention to provide welding apparatus of the class described in which the duration of the arc between the parts to be joined together may be very accurately adjusted and uniformly maintained.

Another object of the invention is to provide, in welding apparatus of the class described whose operation, to perform a welding cycle, may be instituted by depressing a manually actuated control element, safety means which becomes operative during a welding cycle to prevent accidental turning on of the welding current during intervals in which the apparatus is being handled between welding cycles.

The invention possesses other objects and features of advantage, which, together with the foregoing, will be specifically set forth in the detailed description of the invention hereunto annexed. It is to be understood that the invention is not to be limited to the specific form thereof herein shown and described as various other embodiments thereof may be employed within the scope of the appended claims.

Referring to the drawings.

Figures 4, 5:
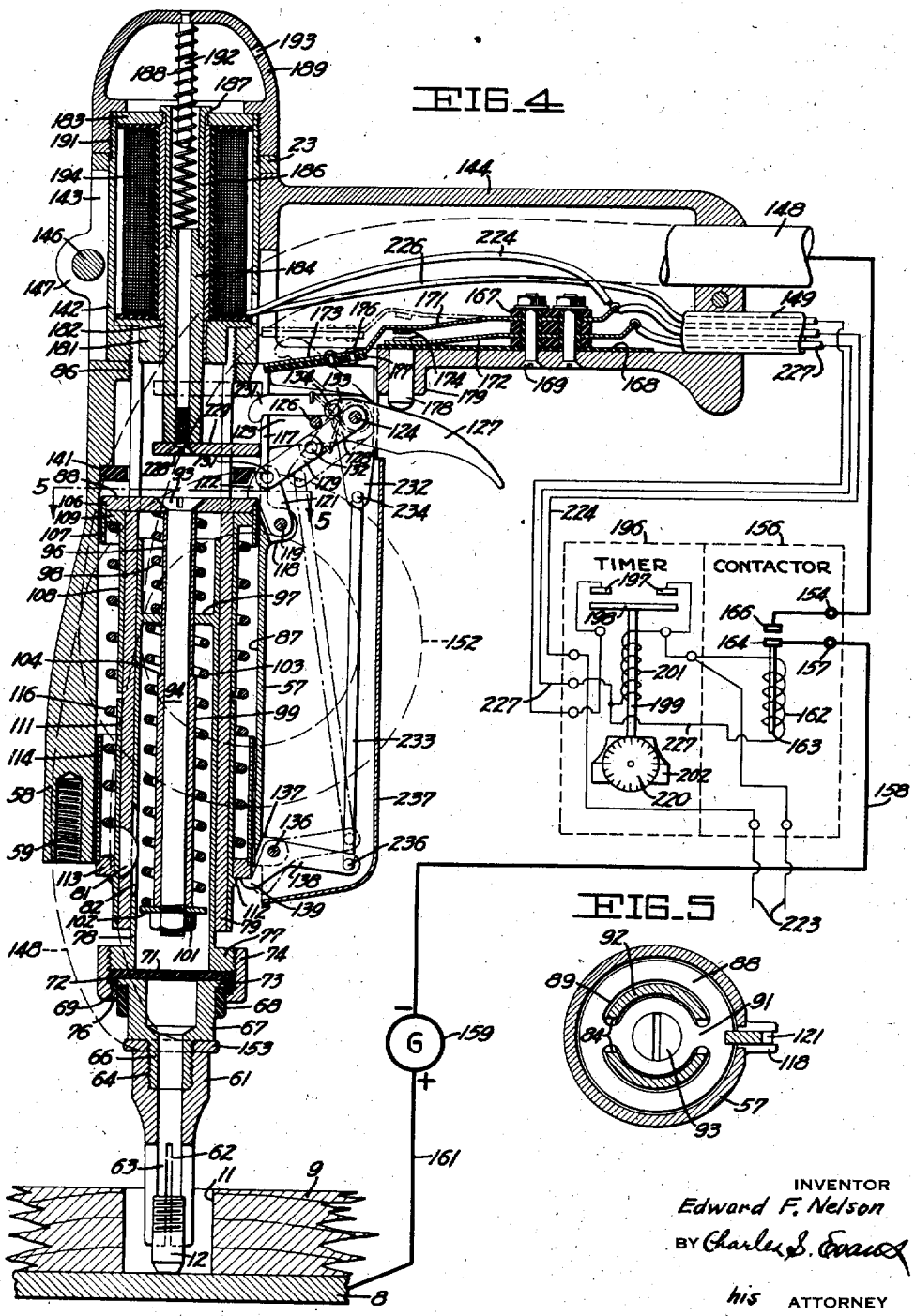

Figure 4 is a vertical sectional view taken in a plane passing medially and longitudinally through the stud welder. The various parts of the structure are shown in the positions they occupy just prior to starting the welding cycle to make a weld. An electrical diagram showing the connections between the various current carrying parts of the apparatus is included as a component part of the view.

Figure 5 is a horizontal cross-sectional view of a portion of the stud welder. The plane in which the view is taken is indicated by the line 5—5 of Figure 4.

Figures 6, 7:
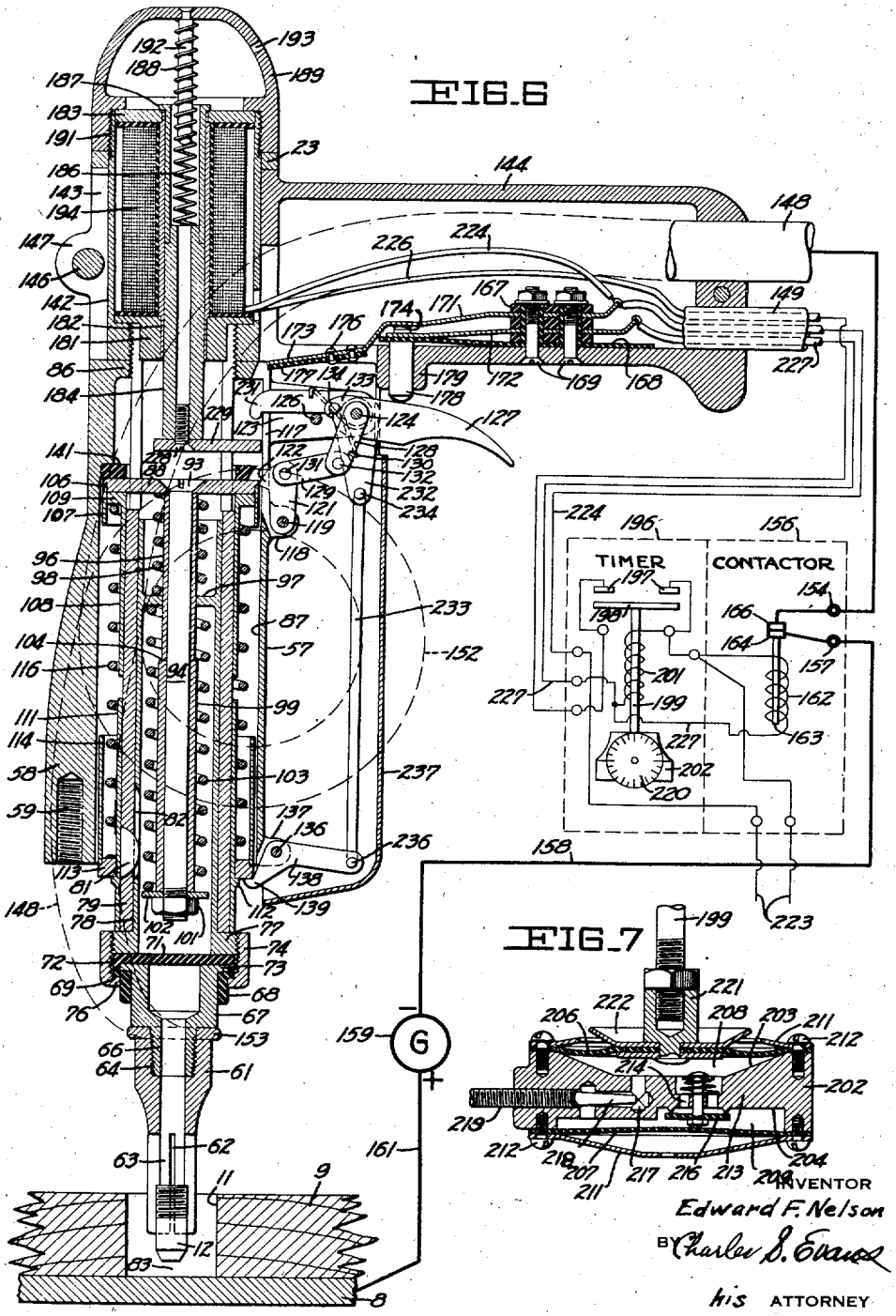

Figure 6 is a view similar to Figure 4 showing the positions of parts of the mechanism after institution of and during the welding cycle.

Figure 7 is a vertical sectional view of the timing unit for variably adjusting the duration of the welding cycle.

In construction work, particularly in shipbuilding, where steel deck plates are overlaid with wooden planking, it has been the custom in the past to first place the planking, drill holes through the planking and the underlying steel plate and then place in these drilled holes suitable bolts for permanently securing the planking to the plate. The placement or removal of such rtaining bolts required the services of two workmen since one had to hold the bolt against turning from one side of the assembled structure while the other workman applied and cinched the nut from the other side of the structure. Such procedure consumed considerable time and seriously slowed down production. In addition to this, only a slight loosening of one or more of the bolt nuts permitted water to seep, through the bolt holes, below deck. In later and improved construction a series of threaded studs were electrically butt-welded directly to the deck plates thus eliminating the through bolt holes and the services of the holder-on for securing the hold-down bolt against turning. This procedure, however, required that the planking, after the studs were placed, be properly positioned over the studs and tapped so as to impress the ends of the studs into the planking, whereupon the latter was removed, bored to provide the stud apertures, and then replaced on the studs. The hold-down nuts were then threaded on to the studs. This series of operations consumed nearly as much construction time as the older through-bolt system. In my aforementioned prior applications it was pointed out how considerable time could be saved in sheathing steel structures with wood or other covering material by first pre-forming in the covering the desired number of stud apertures, then placing the covering in its ultimate position on the steel structure and and then electrically butt-welding the studs to the underlying steel through and concentrically of the apertures in the covering. Thus, immediately after the studs are welded in place, the hold-down nuts may be applied to the studs and tightened.

It is vitally important, since the weld which joins the stud to the steel deck plate is being made in the plank aperture and is therefore obscured from the view of the operator, that the distance the stud is drawn away from the plate, in creating the welding arc, and the length of time that the arc is permitted to burn, to effect raising of the opposed surfaces of the stud and plate to fusion temperature, be very accurately and uniformly maintained for each successive weld if uniformly strong unions are to be had between the studs and plate. In prior devices the welding head, in which the stud forming one electrode of the welding circuit was held, was supported on a stand or tripod which rested on the upper surface of the planking with the stud projecting downwardly into the planking aperture. Suitable stops on guides in the welding head permitted the stud, after contacting the deck plate to be drawn upwardly a predetermined distance to establish the arc gap. However, since the thickness of the planking may vary more or less, it will be seen that variations in the arc gap may also occur which may adversely affect the quality of the resulting weld.

In the welding heads of my prior applications, I disclosed the use of a dashpot in which oil was displaced by a moving piston to time the duration of the welding arc. This arrangement operated satisfactorily and accurately maintained the timing if relatively small diameter studs were being attached to the plate and if sufficient time elapsed between welds to allow any heat absorbed by the welding head to be dissipated. However, if heavier studs were being handled, thereby necessitating a longer burning of the arc and if the sequence of welds was rapid, in order to maintain maximum production, considerable heat would be transmitted through the metallic parts of the head to the oil in the dashpot cylinder. Upon becoming heated, the viscosity of the oil changed and consequently lessened the duration of the arc which adversely affected the strength of the weld.

Another undesirable feature inherent in prior stud welding mechanisms is that no provision is made, during intervals when the operator is handling or conditioning the mechanism between welds, for preventing the heavy welding current from being turned on accidentally, should the operator happen to inadvertently depress the starting trigger with which most of these mechanisms are equipped, and seriously burning the operator if his hands are in contact with a current carrying piece of the apparatus.

All of these undesirable features have been overcome in the device of the present invention. First, the welding mechanism may be quickly set for each weld to produce a uniform arc gap regardless of the amount of variation in thickness of the planking; second, the timing of the weld is accomplished by a device remote from the scene of the weld where it will not be affected by heat absorbed by the welding head; and, third, a safety device is included in the mechanism which positively prevents turning on of the welding current until the mechanism has been fully conditioned to make the succeeding weld.

Figure 1:
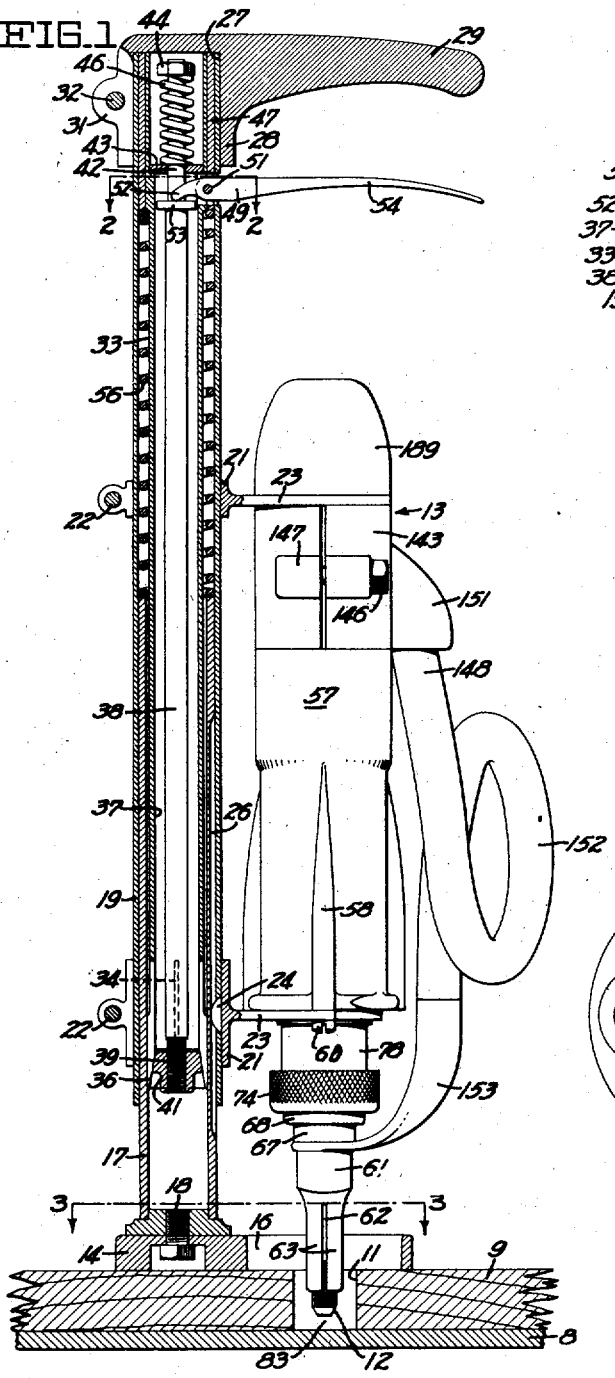
Figure 1 is a view, partly in side elevation and partly in vertical section, showing the stud welder and its support.

In detail, I have shown in Figures 1, 4, and 6, a steel deck plate 8 overlying which is wooden planking 9, which is to be secured to the plate 8, having an aperture 11 therethrough into which the threaded stud 12, which is to be butt-welded to the upper surface of the deck plate 8 in the position in which it is shown in Figure 4, may be inserted. A suitable shouldered nut, not shown, is adapted to be threadedly engaged with the stud, after the latter has been welded in position, for tying the planking and the deck plate together. The plate 8 forms one electrode of the welding circuit while the stud 12 forms the other electrode thereof and it is the function of mechanism termed the welding head and generally indicated by the numeral 13 in Figure 1, to, first, hold the stud, as shown in Figure 4, in contact with the surface of the plate until the welding current is turned on; secondly, to draw the stud away from the plate, as shown in Figures 1 and 4, to create an arc gap, and, thirdly, after the end of the stud and surface of the plate have been brought to the melting point by the arc flame, to quickly join the melting members so as to effect the union thereof.

During the welding cycle the main portions of the welding head are rigidly supported in a fixed position. This is accomplished by a suitable supporting structure such as that fully described in my application Serial No. 410,793 filed September 13, 1941, comprising a base 14, which rests on the upper surface of the planking 9, having therein an opening 16, through which the stud 12 may be raised and lowered, and an upwardly rising tubular post 17 which is secured, at its lower end, to the base by a screw 18. Telescoping over and slidable axially of the post 17, is a tube 19 having thereon a pair of spaced brackets, each comprising a split collar 21 secured to the tube by means of a clamp screw 22 and having extensions 23 which are attached to the welding head 13 so as to position the latter axially concentric with the base opening 16. A key 24, projecting through a suitable opening formed in and adjacent the lower end of the tube 19 and entering a keyway 26 cut longitudinally in the periphery of the post 17, serves to prevent relative rotation between the tube and post and thereby to maintain the stud 12 in axial concentricity with the base opening 16. The upper end of the tube 19 extends into a bored recess 27 formed in a hub 28 having a radially projecting grip 29, and the hub is split axially of the recess 27 and provided with apertured lugs 31 bearing a clamp bolt 32 for clamping the tube 19 in the recess 27. The grip 29 provides a hand hold for the operator so that he may raise and lower the welding head with respect to the base 14.

Means is provided for securing the welding head in a selected elevated position. Secured at its upper end in the recess 27, by the clamp bolt 32, and positioned within the tube 19, is a collet sleeve 33 which extends downwardly in axial concentricity with the tube 19, terminates adjacent the lower end of the latter, and telescopes within the post 17. The lower end of the collet sleeve is provided with a plurality of circumferentially spaced, axially extending, slots 34, and with a tapered countersink 36 forming a continuation of the internal bore 37 of the sleeve. This construction provides a plurality of radially flexible fingers at the lower end of the collet sleeve. Positioned concentrically within the collet sleeve is a control rod 38 secured to the lower threaded end 39 of which is a frusto-conical plug 41 complementary with and engaged in the tapered countersink 36 of the collet sleeve. The upper end 42 of the control rod passes slidably through a central aperture formed in a washer 43 which rests, in a fixed position spaced from the upper end of the collet sleeve, against a shoulder formed within the bore of the sleeve. A nut 44 is threaded on the extreme upper end of the control rod; and interposed between the nut 44 and the washer 43, is an expansion spring 46. The spring 46 is for the purpose of urging the control rod 38 upwardly in a direction axially of the collet sleeve 33 so as to draw the plug 41 into the countersink 36 thereby radially urging the flexible fingers into tight frictional engagement with the inner periphery of the post 17. This locks the movable tube 19 and the post 17 against relative longitudinal displacement and also holds the welding head firmly in the desired elevated position. In the event that a welding head of considerable weight is being used, the peripheral surfaces of the fingers contacting the post 17 may be knurled so as to bite into the surface of the post and thereby obtain maximum grip between the engaged parts.

Figure 2:
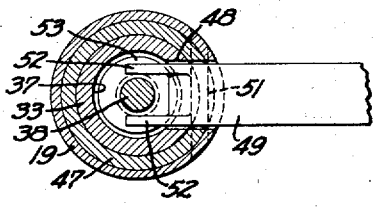
Figure 2 is a horizontal sectional view of a portion of the support. The plane in which the view is taken is indicated by the line 2—2 of Figure 1.
Figure 3:
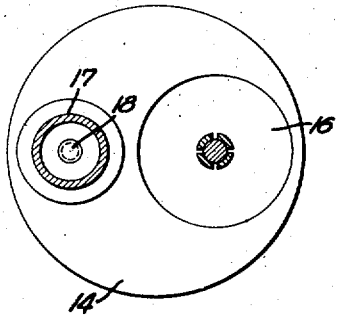
Figure 3 is a horizontal sectional view of the lower portion of the support and stud welder. The plane in which the view is taken is indicated by the line 3—3 of Figure 1.

Means is provided for releasing the connected post 17 and tube 19, to permit raising and lowering of the welding head 13, and means is also provided for partially counter-balancing the weight of the welding head to assist in the raising thereof. Positioned within the recess 27 and between the concentric tube 19 and collet sleeve 33, is a short tubular filler 47 and the assembled tubular members are provided with aligned apertures which form, as is best shown in Figure 2, an opening 48 through which passes a release lever 49. A pin 51, having its opposite ends seated in holes drilled into the tube 19 and filler 47, extends transversely across the opening 48 and through a journal hole bored in the release lever so that the latter is pivotally mounted on the pin. The inner end of the release lever is bifurcated to provide a pair of fingers 52 which bear against a washer 53 secured to the control rod 38, and the outer end 54 of the release lever is extended substantially parallel to and outwardly substantially equal to the length of the grip 29. When the operator desires to raise or lower the welding head, he extends one or more of the fingers of his hand resting on the grip 29 to engage the outer end 54 of the release lever and to draw the said outer end of the lever towards the grip. This causes the fingers 52 to move the control rod 38 downwardly so as to move the plug 41 out of the countersink 36 thereby releasing the radial pressure of the collet fingers against the inner wall of the post 17. With the base maintained in contact with the surface of the planking 9, the tube 19 and the various parts, including the welding head, carried thereby may be shifted longitudinally of the post 17 to any desired position. Release of the lever extension 54 will again set the friction lock to secure the welding head in fixed relation to the base 14. An axially expansible spring 56, positioned within the tube 19, and interposed between the ends of the post 17 and the filler tube 47, respectively, serves, when the friction lock is released, to urge the tube 19 and its connected parts upwardly thereby partially counterbalancing the weight of the welding head 13.

As was stated above, a uniform arc gap should be maintained in successive welds if each weld is to possess the maximum of strength. As will be explained in detail later, the mechanism of the welding head is pre-set so that, as shown in Figure 4, the lower end of the stud 12 rests on the upper surface of the deck plate 8. When the welding current is turned on, action takes place within the welding head, and while the latter is held rigidly fixed with relation to the deck plate, which moves the stud 12 to a position elevated above the deck plate, as shown in Figure 1, to create the arc gap between the stud and plate. The length of this arc gap is usually only a small fraction of an inch and chosen to produce the desired arc flame depending upon the amount of welding current available. It will be seen that if the distance between the upper surfaces of the deck plate 8 and the overlying planking 9 is uniformly the same in each aperture 11 in which a stud is to be placed, the welding of a large number of studs may be carried forward in the knowledge that the arc gap of each successive weld will be the same as that of the previous welds. However, due to variations in thickness in the planking 9 and the possibility of raised seams, protuberances or depressions in the surface of the deck plate 8 happening to coincide with one or more of the apertures 11, the depths of all of the apertures will not be alike. Using previously known equipment, work was seriously retarded by the requirement that the workman, before making each weld, measures the depth of each hole and set the welding head support to provide the desired arc gap. With the apparatus of my invention, it is only necessary, after the welding head has been conditioned, or "cocked," as shown in Figure 4, to place the base 14 in position on the planking 9 over the aperture 11, and release the friction lock between the post 17 and tube 19 so as to allow the stud 12 to descend into the aperture 11 until it just touches the surface of the deck plate. The lock may be then re-engaged since the stud is now positioned to provide the correct length of arc gap when it is drawn away from the plate by the mechanism within the welding head. It will be therefore seen that a workman may quickly set the apparatus for each individual hole in which a stud is to be mounted without appreciably cutting down his production speed.

The welding head comprises a preferably cast metallic casing 57, having at its lower end a plurality, preferably three, of bosses 58 each being provided with threaded sockets 59 which receive screws 60 for securing the lower bracket extension 23 to the casing 57. The threaded sockets 59 also may be used, when the welding head is being employed without its supporting structure shown in Figure 1, to receive the threaded ends of coaxial rods whose lower ends may rest against the planking so as to form a tripod for supporting the welding head in axially vertical position. Such a support may be employed when the welding head is being used in cramped quarters in which there is not sufficient headroom for proper operation of the supporting structure of Figure 1.

Means is provided for supporting the stud 12 so that it may be moved, independently of the movement thereof permitted by the adjustable supporting structure described above, along a path away from and toward the surface of the deck plate 8. A chuck 61 is provided, the lower end of which is centrally bored to form a socket, which receives the upper end of the stud 12, and is provided with longitudinally extending slots 62 which form, at the lower end of the chuck, a plurality of flexible fingers 63 gripping the stud and frictionally holding the latter in the chuck socket. The opposite end of the chuck is provided with a threaded bore 64 in which the correspondingly threaded shank 66 of a plug 67 is engaged. Surrounding the periphery of the plug 67 is an insulating sleeve 68 having a peripheral flange 69 thereon. An insulating disk 71 overlies the end of the plug 67, adjacent the insulating sleeve 68 and is provided with an annular skirt 72 which overlies a retaining flange 73 on the plug. Surrounding the insulating sleeve 68 and disk 71 is a cap 74 having an annular lip 76 engaging the shoulder of the flange 69 and which is internally threaded and engaged with a correspondingly threaded flange 77 formed at one end of a tubular ram 78 so as to clamp the plug 67 to the ram. The provision of the disk 71 and the sleeve 68 electrically insulates the stud '2 and its supporting chuck from the ram 78 and the remainder of the mechanism which will presently be described.

The ram 78 is mounted so as to freely slide axially of and within a stationary tube 79, the latter being provided with a fixed key 81 which operates in a slot 82 formed in the ram so that motion of the ram is confined to axial directions, the key 81 serving to prevent any relative rotational movement between the ram and the tube. The end of the tube 79 adjacent the flange 77 of the ram is spaced from the latter a distance corresponding to the length of arc gap desired so that, when the ram is moved upwardly until the flange 77 contacts the end of the tube 79 the arc gap 83, shown in Figures 1 and 6 will be established between the lower end of the stud 12 and the upper surface of the deck plate 8. The opposite end of the tube 79 is provided with a pair of axially extending diametrically opposed slots 84, best shown in Figure 5, and is externally threaded to engage the threads in the bore of a hub 86 formed at the end of the casing 57. This mounts the tube in fixed relation to and concentric with the casing within the bore 87 thereof.

A circular disk 88, best shown in Figure 5, is provided with a pair of concentric arcuate apertures 89 and with bridge portions 91 passing through the slots 84 of the tube 79, the portions 92 of the tube between the slots passing through the disk apertures 89. The disk is thus mounted concentrically with the tube and is free to be moved axially thereof in the slots 84. The disk is provided with a central countersunk aperture which receives the conical head 93 of a bolt 94 which extends concentrically of the ram 78 toward the lower or chuck end thereof. A spacer tube 96, on the bolt 94, passes slidably through a central aperture formed in a wall 97 formed in the ram 78 intermediate the ends thereof and a coil spring 98, concentric with the bolt, is interposed between the wall 97 and the disk 88. A relatively larger tube 99 is also carried by the bolt 94 and this latter tube and the spacer tube 96 are secured in place by means of a nut 101 and washer 102 secured to the extreme lower end of the bolt. A coil spring 103 concentric with the bolt has its respective ends engaged with the ram wall 97 and the washer 102. The shoulder 104 provided between the smaller and larger tubes 96 and 99 acts as a stop against which the ram wall 97 may impinge to limit downward movement of the ram. The outer periphery of the disk 88 is provided with a circular shoulder 106, onto which is pressed one end of a tubular skirt 107. A sleeve 108 is slidably mounted on the tube 79 and has an end flange 109 engaging the disk 88, and a similar sleeve 111 is slidably mounted on the lower end of the tube 79 and has a peripheral flange 112 against which is positioned an annular collar 113 peripherally shouldered to receive one end of a tubular skirt 114 projecting into the casing bore 87. The sleeve 111, collar 113 and skirt 114 are all secured together as a unit. Surrounding the sleeves 108 and 111 and extending between the flange 109 and collar 113 is an axially expansive coil spring 116. The spring 116 is normally held under compression and serves as the actuating member for forcibly moving the stud 12 successively away from and toward the surface of the deck plate 8.

Means is provided for releasing one end of the coil spring 116 so as to move the stud 12 away from the deck plate 8 so as to create the arc gap therebetween. Positioned adjacent the lower edge of an opening 117, formed in the side wall of the casing 57, is a pair of spaced lugs 118 bearing a pivot pin 119 upon which is journaled a latch lever 121 having a dog 122 thereon which is engaged with the upper surface of the disk 88. A relatively longer pair of lugs 123 are provided, spaced from the lugs 118, which carry a pivot pin 124 and a stop pin 126 spaced from the pivot pin 124. On the pivot pin 124 is pivotally mounted a trigger 127 and one section 128 of a hinged link; the other section 129 of the link being attached by means of a pivot pin 131 to the latch lever 121. A pivot pin 132 connects the two sections 128 and 129 of the hinged link. A torsion spring 130 urges the link section 128 against the stop pin 126. The trigger 127 is provided with an integral extension 133 carrying a trip pin 134 which overlies an edge of the section 128 of the hinged link. Pivotally mounted on a pivot pin 136, which is carried by a pair of lugs 137 positioned adjacent the lower end of the casing 57, is a latch lever 138 having a dog 139 which engages the lower surface of the collar 113. The spring 116, which is under compression when the welding head is ready for use, is therefore confined against longitudinal expansion by the latch dogs 122 and 139. Viewing the structure of Figure 4, when the operator pulls the trigger 127, the trip pin 134 will contact and swing the link section 128 about the latters' pivot so that the center of the hinge pivot 132 will be moved out of the plane passing through the axes of all of the pivots thereby causing the hinged link to buckle and permitting the latch lever dog 122 to release its engagement with the disk 88. This permits the disk 88 to move upwardly under the influence of the expanding spring 116 until the disk engages a rubber bumper 141 seated adjacent the bottom of the casing bore 87. Movement of the disk 88 will cause a corresponding movement upwardly of the bolt 94 and consequently the ram 78 will be moved until the upper face of the flange 77 impinges against the lower end of the tube 79. This raises the stud 12, as shown in Figure 6, to a position elevated above the deck plate 8 so that the arc gap 83 is created between the deck plate and the lower end of the stud.

Means is provided for conducting welding current to the stud 12 so as to create an electric arc between the stud and deck plate. The threaded end of the tube 79 extends upwardly beyond the upper end of the casing 57 and is engaged with one end of a tubular steel shell 142. On the shell 142 is mounted the split collar 143 formed integrally with a hollow pistol-grip handle 144; a screw 146 passing through apertured lugs 147 formed on the collar 143 serving to clamp the collar securely to the shell 142. The outer end of the handle 144 is provided with a pair of openings through one of which passes a welding current cable 148 and through the other of which passes a control current cable 149. After entering the handle 144 the cable 148 emerges from the side thereof through a tubular boss 151, as shown in Figure 1, is then formed with a loop 152 and is provided at its end with a spade connector 153 whose apertured end is secured on the shank 66 between the chuck 61 and the plug 67. The other end of the cable 148 is connected to one terminal 154 of an electro-magnetic contactor 156, the other terminal 157 of the contactor being connected to one end of a conductor 158 which connects with an output terminal of a direct current welding current generator 159. A conductor 161, attached, at its respective ends, to the other output terminal of the generator 159 and, by means of a suitable clip, to the deck plate 8, completes the welding current circuit. An actuating solenoid 162 drives an armature 163 in the contactor 156 to move the movable contact 164 into engagement with the fixed contact 166 so as to make or break the circuit between the conductors 148 and 158.

Positioned within the handle 144 and electrically insulated therefrom by insulating blocks 167 and a flexible insulating strip 168, which are mounted on the handle by screws 169, is a pair of flexible metallic switch blades 171 and 172 which, in their normal positions of rest as shown in Figure 4, are spaced apart at their free ends. The upper switch blade 171 is provided with an extension 173, projecting beyond the contacts 174 to which is attached, by rivets 176, a strip of insulating material 177. A push button 178, slidably mounted in an apertured boss 179, positioned adjacent the end of the switch blade 172, has one end thereof positioned in contact with the insulating strip 168 below the said end of the switch blade 172 and the other end thereof in contact with the trigger 127 at a point thereon spaced from the trigger pivot pin 124.

Within the shell 142, and positioned adjacent the bottom thereof, is an annular iron pole piece 181 which is centrally bored to receive one end of a non-ferrous sleeve 182 which extends upwardly concentrically with the shell. The upper end of the sleeve 182 is secured in the central aperture of an iron disk 183 pressed into the upper end of the shell 142. The disk 183, shell 142 and pole piece 181 form, together with a cylindrical iron armature 184 which is slidably mounted in the sleeve 182, a magnetic circuit. A tubular, non-ferrous, extension 186 of the armature 184 has, at the upper end thereof, a flange 187 engageable with the upper surface of the disk 183 so that the downward movement of the armature 184 may not exceed a given limit and a coil spring 188, having its lower end engaged with the armature and its upper end engaging a cap 189 which is mounted by means of threads 191, on the upper end of the sleeve 142, serves to urge the armature toward its lower limit of travel. A guide pin 192, secured in the cap 189 and extending into the spring 188 for substantially half of its length prevents lateral buckling of the spring when the latter is compressed; and a vent opening 193 permits the escape of compressed air from the interior of the cap when the armature is moved upwardly. A solenoid coil 194, placed within the shell 142, concentric with the armature 184 serves to create magnetic flux in the magnetic circuit to move the armature upwardly against the pressure of the spring 188.

A timer 196 is provided which, together with the magnetic contactor 156, may be placed in a position remote from the welding head such as, for instance, on the usual portable hand truck which carries the welding generator 159. The timer comprises a pair of relay contacts 197 which may be bridged by a movable contactor 198 carried on an armature 199 which is actuated by a solenoid coil 201. As is shown in Figure 7, the timer includes a variable dashpot which controls the welding cycle. The dashpot, which may be one of several well-known makes obtainable in the open market, comprises a housing 202 having in opposite sides thereof recesses 203 and 204 which are each covered by flexible diaphragms 206 and 207 to provide a pair of separate chambers 208 and 209 in the housing. The diaphragms are secured to the housing by suitable pressure plates 211 and screws 212. In the housing wall 213 separating the two chambers 208 and 209, is one or more by-pass openings 214, normally closed by a spring-pressed check valve 216 which opens downwardly into the chamber 209, and a bleeder passage 217 into which extends a tapered blocking valve 218 carried on a threaded stem 219 tapped into the housing. The outer end of the stem 219 carries a dial 220 upon which suitable graduations indicating desired time settings are carried. The lower end of the armature 199, or a rod extension of the armature, is threadedly engaged in a hub 221 secured, together with clamp washers 222, to the upper diaphragm 206. The weight of the armature 199 normally maintains the upper diaphragm 206 in depressed condition so that substantially all of the air in the upper chamber 208 is forced through the by-pass opening 214 and past the check valve 216 into the lower chamber 209. When the solenoid 201 is energized it will urge the armature 199 upwardly thereby creating a reduced pressure in the upper chamber 208 and causing the air in the lower chamber to flow through the bleeder passage 217 past the blocking valve 218 into the upper chamber. This creates resistance to the upward movement of the armature depending upon the rate at which the air is allowed to flow past the blocking valve.

Control current input leads 223, which are connected to a source of 110 volt alternating current, are provided, one of which is connected to the upper end of each solenoid coil 162 and 201 and also to one of the timer contacts 197. The other lead 223 is connected by a conductor 224 to the upper switch blade 171, in the handle 144, and also to one end of the solenoid coil 194. The other conductor 226 from the coil 194 is run directly to the other timer contact 197. The lower switch blade 172 is connected by a conductor 227 to the lower ends of each of the solenoid coils 162 and 201.

When the trigger 127 is pulled by the operator, so as to release the latch lever 121 and permit the spring 116 to raise the stud 12 to create the arc gap 83, the push button 178 is simultaneously moved upwardly, as shown in Figure 6, to move the lower switch blade 172 upwardly toward the other switch blade 171 so as to engage the contacts 174. This closes the circuits to each of the solenoid coils 162 and 201, causing the former to engage the contacts 164 and 166 of the welding current contactor 156 so as to create the arc flame between the stud 12 and deck plate 8, and causing the latter to start the timer armature 199 in its upward movement. As soon as the contactor 198 of the timer reaches and bridges the contacts 197, current will flow into the solenoid coil 194 which will then cause the armature 184 to move upwardly against the pressure of the spring 188.

Means is provided, which is actuated upon movement of the armature 184, for releasing the lower end of the spring 116 so as to plunge the end of the stud 12, which will now have been brought by the arc flame to a temperature very close to the melting point of the stud metal, into the molten metal of the arc crater in the deck plate thereby effecting the weld between the parts to be joined. Mounted on the lower end of the armature 184, by a screw 228 which is tapped into the end of the armature, is a trip bar 229 which extends through the casing opening 117 and contacts, during upward movement of the armature, the end of one arm 231 of a bell crank which is pivotally mounted on the trigger pivot pin 124 and which has its other arm 232 extending downwardly toward the lower end of the welding head. A rod 233 engaged at its respective ends in apertures formed in the bell crank arm 232 and in the latch lever 138 to provide pivots 234 and 236 connects these parts for movement together. A channel-shaped guard 237 secured by suitable screws to the casing 57 protects the latch levers and their associated parts against exposure or damage. As soon as the trip bar 229 raises the arm 231, the planar alignment of the pivots 124—234—236 will be disturbed and will permit the arm 232 to swing to its position shown by the dot and dash lines thereby permitting the latch lever 138 to swing upwardly so as to move the latch dog 139 from below the collar 113. As soon as this occurs, the sleeve 111 will move downwardly under the influence of the expanding spring 116 and will carry with it the chuck assembly thereby returning the end of the stud 12 into engagement with the deck plate 8. Simultaneously with this action, the arm 231, in moving upwardly, contacts the insulating member 177 of the upper switch blade, to the position indicated by the dot and dash lines, to cause the contacts 174 to separate. This immediately deenergizes the solenoid coil 162 and opens the contactor contacts 164 and 166 thereby shutting off the welding current. Since the contacts 174 are now separated a distance greater than the maximum movement of the push button 178, the welding current may not be deliberately or accidentally turned on by pressure against the trigger 127 until the welding head is again conditioned to make the succeeding weld. This safety feature prevents the operator from receiving severe accidental burns or shocks. After the weld is completed the welding head is lifted so as to pull the stud from the chuck. The resistance offered by the stud to being separated from the chuck is sufficient to cause the plunger and its associated parts to be moved toward the lower end of the welding head thereby partially compressing the spring 116 and causing resetting of the latch lever 121. The act of placing a new stud in the chuck and pressing downwardly on the welding head so as to firmly seat the stud in the chuck is sufficient to further compress the spring 116 and to cause the latch dog 139 to snap in place below the collar 113. The welding head is now fully conditioned for the new weld with the exception of a possible adjustment of the support should the new hole, in which the stud is to be welded, happen to vary in depth from the preceding one.

I claim:

1. In combination, an electric welding circuit including first and second metallic members to be welded together and forming the respective electrodes of said welding circuit, a welding head including a movable ram carrying said first metallic member, a support, for engaging a surface adjacent said second metallic member, carrying said welding head and adjustably extensible to primarily move said welding head, ram and first metallic member bodily toward or from said second metallic member, unitary confined pressure means in said welding head and operatively connected with said ram for successively secondarily moving said ram and the first metallic member carried thereby into spaced relation with said second metallic member, to establish an electric arc between the said metallic members, and then into contiguous relation to join said metallic members, means for releasing said confined pressure means to move the ram and first metallic member into spaced relation with the second metallic member, and separate means for releasing said confined pressure means to move the ram and first metallic member toward said second metallic member.

2. In combination, an electric welding circuit including first and second metallic members to be welded together and forming the respective electrodes of said welding circuit, a welding head including a movable ram carrying said first metallic member, a support, for engaging a surface adjacent said second metallic member, carrying said welding head and adjustably extensible to primarily move said welding head, ram and first metallic member bodily toward or from said second metallic member, unitary confined pressure means in said welding head and operatively connected with said ram for successively secondarily moving said ram and the first metallic member carried thereby into spaced relation with said second metallic member, to establish an electric arc between the said metallic members, and then into contiguous relation to join said metallic members, manually operable means for releasing said confined pressure means to move the arm and first metallic member into spaced relation with the second metallic member, means operative at the end of a predetermined interval of time after operation of said manually operable releasing means for releasing said confined pressure means to move the ram and first metallic member toward said second metallic member, and means situated remote from said welding head for adjustably varying said interval of time.

3. In combination, an electric welding circuit including first and second metallic members to be welded together and forming the respective electrodes of said welding circuit, a welding head including a movable ram carrying said first metallic member, a support, for engaging a surface adjacent said second metallic member, carrying said welding head and adjustably extensible to primarily move said welding head, ram and first metallic member bodily toward or from said second metallic member, a unitary spring mounted in said welding head and engaged with and expansible to move said ram alternately in opposite directions, first and second latches releasably engaging opposite ends of said spring for confining said spring under compression, manually operable means for releasing one end of said spring to move the ram and first metallic member into spaced relation with the second metallic member, electro-magnetically actuated means operative at the end of a predetermined interval of time after operation of said manually operable releasing means for releasing the other end of said spring to move the ram and first metallic member in an opposite direction toward said second metallic member, and means situated remote from said welding head for actuating said electro-magnetic spring releasing means.

4. In combination, an electric welding circuit including first and second metallic members to be welded together and forming the respective electrodes of said welding circuit, a welding head including a movable arm carrying said first metallic member, a support, for engaging a surface adjacent said second metallic member, carrying said welding head and adjustably extensible to primarily move said welding head, ram and first metallic member bodily toward or from said second metallic member, a unitary spring mounted in said welding head and engaged with and expansible to move said ram alternately in opposite directions, first and second latch levers pivotally mounted on said welding head and releasably engaging opposite ends of said spring for confining said spring under compression, a manually operable trigger pivotally mounted on said welding head and operatively connected with and to move said first latch lever to release one end of said spring so as to move the ram and the first metallic member into spaced relation with the second metallic member, an electro-magnetically actuated armature movably mounted in said welding head, a bell crank pivotally mounted on said welding head operatively connected with and to move said second latch lever to release the other end of said spring so as to move the ram and first metallic member toward the second metallic member, said bell crank having an arm extending into the path of movement of, and to be moved by, said armature, and means situated remote from said welding head operatively connected with and to move said armature.

5. In combination, an electric welding circuit including an electro-magnetically controlled contactor and first and second metallic members to be welded together and forming the respective electrodes of said welding circuit, an electro-magnetically actuated variable interval timer, a welding head including a movable ram carrying said first metallic member, a support, for engaging a surface adjacent said second metallic member, carrying said welding head and adjustably extensible to primarily move said welding head, ram and first metallic member bodily toward or from said second metallic member, a unitary spring mounted in said welding head and engaged with and expansible to move said ram alternately in opposite directions, first and second latch levers pivotally mounted on said welding head and releasably engaging opposite ends of said spring for confining said spring under compression, a manually operable trigger pivotally mounted on said welding head and operatively connected with and to move said first latch lever to release one end of said spring so as to move the ram and the first metallic member into spaced relation with the second metallic member, a control switch mounted on said welding head and connected with and to be closed by said trigger upon movement of the latter, said control switch being included in control circuits for energizing said contactor to close the welding circuit and for starting said interval timer, a bell crank pivotally mounted on said welding head operatively connected with and to move said second latch lever to release the opposite end of said spring so as to move the ram and first metallic member into engagement with the second metallic member, said bell crank having an arm extending therefrom, a solenoid coil in said welding head, an armature within and movable by the coil upon excitation of the latter, said armature having an extension thereof engageable with said bell crank extension so as to connect the armature and bell crank for movement together, and a switch in said timer in circuit with said solenoid coil for closing an electric circuit to said coil during operation of said timer.

6. In combination, an electric welding circuit including an electro-magnetically controlled contactor and first and second metallic members to be welded together and forming the respective electrodes of said welding circuit, an electro-magnetically actuated variable interval timer, a welding head including a movable ram carrying said first metallic member, a support, for engaging a surface adjacent said second metallic member, carrying said welding head and adjustably extensible to primarily move said welding head, ram and first metallic member bodily toward or from said second metallic member, a unitary spring mounted in said welding head and engaged with and expansible to move said ram alternately in opposite directions, first and second latch levers pivotally mounted on said welding head and releasably engaging opposite ends of said spring for confining said spring under compression, a manually operable trigger pivotally mounted on said welding head and operatively connected with and to move said first latch lever to release one end of said spring so as to move the ram and the first metallic member into spaced relation with the second metallic member, a control switch mounted on said welding head and connected with and to be closed by said trigger upon movement of the latter, said control switch having a pair of flexible contact arms one of which has an extension, said control switch being included in control circuits for energizing said contactor to close the welding circuit and for starting the operation of said interval timer, a solenoid coil in said welding head, an armature within and movable by the coil upon excitation of the latter, said armature having an extension thereon, a switch in said timer in circuit with said solenoid coil for closing an electric circuit to said coil during operation of said timer, a bell crank pivotally mounted on said welding head operatively connected with and to move said second latch lever to release the opposite end of said spring so as to move the ram and first metallic member toward and into engagement with the second metallic member, said bell crank having an arm extending therefrom into the path of movement of said armature extension so as to be engaged and moved by said extension upon movement of the armature, and said bell crank arm being movable, by and upon release of said opposite end of the spring, into engagement with said control switch extension to open said control switch.

7. In combination, a welding head for carrying a first metallic member to be welded to a second metallic member, means for positioning said welding head relative to said second metallic member, a single self-propelling element in said welding head for moving said first metallic member in a cycle from and toward said second metallic member, and means positioned remote from said welding head for operatively confining the successive movement cycles of said first metallic member to substantially identical intervals of time.

8. In combination, a welding head for carrying a first metallic member to be welded to a second metallic member, a support carrying said welding head and engaging a surface for supporting said welding head in relation to said second metallic member, a single element in said welding head for moving said first metallic member away from the second metallic member and, after an interval of time, for further moving said first metallic member toward said second metallic member, powered release mechanism in said welding head for controlling movement of said moving element for the first metallic member, a timer remote from said welding head for instituting power pulses at substantially identically spaced intervals of time after movements of said first metallic member away from said second metallic member, and means for conducting said power pulses from said timer to said powered release means.

9. In combination, a welding head for carrying a first metallic member to be welded to a second metallic member, means for positioning said welding head relative to said second metallic member, and a single self-propelling element in said welding head for moving said first metallic member in a cycle from and toward said second metallic member.

10. In a welding apparatus, a casing, a ram slidably mounted in said casing, a spring for moving the ram axially in either direction, a pair of latches for restraining the action of the spring, means for releasing one of the latches to permit the spring to move the ram in one direction, and time controlled means remote from the casing and initiated by the releasing means for releasing the other latch to permit the spring to move the ram in the other direction.

11. In a welding apparatus, a casing, a ram slidably mounted in said casing, a spring for moving the ram axially in either direction, a pair of latches for restraining the action of the spring, means for releasing one of the latches to permit the spring to move the ram in one direction, means acting in time with the releasing means for closing a welding circuit, means for releasing the other latch to permit the spring to move the ram in the other direction, time controlled means remote from the casing and initialed by the first named releasing means for operating the last named releasing means, and means acting in time with said last named releasing means for opening the welding circuit.

12. In a welding apparatus, a casing, a ram slidably mounted in said casing, a spring for moving the ram axially in either direction, a pair of latches for restraining the action of the spring, means for releasing one of the latches to permit the spring to move the ram in one direction, means for releasing the other latch to permit the spring to move the ram in the other direction, and means acting in time with movements of the ram for closing and opening a welding circuit.

13. In a welding apparatus, a casing, a ram slidably mounted in said casing, a spring for moving the ram axially in either direction, a pair of latches for restraining the action of the spring, means for releasing one of the latches to permit the spring to move the ram in one direction, means acting in time with the releasing means for closing a welding circuit, means for releasing the other latch to permit the spring to move the ram in the other direction, time controlled means acting in time with the first named releasing means for operating the last named releasing means, and means acting in time with said last named releasing means for opening the welding circuit.

14. In a welding apparatus, a casing, a ram axially slidable in said casing, spring means for moving the ram in either direction, latches for restraining movement of the spring means, manually operated means for releasing one of the latches to permit the spring means to move the ram in one direction, a solenoid and circuit for releasing the other latch to permit the spring means to move the ram in the other direction, time controlled means initiated by said manually operated means for closing the solenoid circuit, and means acting in time with movements of the ram for closing and opening a welding circuit.

15. In a welding apparatus, a casing, a ram axially slidable in said casing, spring means for moving the ram in either direction, latches for restraining movement of the spring means, manually operated means for releasing one of the latches to permit the spring means to move the ram in one direction, a solenoid and circuit for releasing the other latch to permit the spring means to move the ram in the other direction, and time controlled means initiated by said manually operated means for closing the solenoid circuit.

16. In a welding apparatus, a casing, a stud within the casing, a ram slidable on the stud, a pair of spaced push rings slidable on the stud and operatively connected to move the ram, a spring compressed between the push rings, a latch associated with each push ring for controlling its spring pressed movement, manually operated means for releasing one of the latches, a solenoid and circuit for releasing the other latch, and means timed from the operation of the manually operated releasing means for closing the solenoid circuit.

17. In a welding apparatus, a casing, a stud within the casing, a ram slidable on the stud, a pair of spaced push rings slidable on the stud and operatively connected to move the ram, a spring compressed between the push rings, a latch associated with each push ring for controlling its spring pressed movement, manually operated means for releasing one of the latches, means for releasing the other latch, and time controlled means remote from the casing and acting in time with the manually operated releasing means for operating said other latch releasing means.

18. In an apparatus for electrically welding a stud to a plate, a casing, a ram slidably mounted in said casing and having means thereon for holding the stud against the plate, a pair of spaced push rings slidable in the casing and operatively connected to move the ram, a spring compressed between the push rings, a pair of latches for restraining the action of the spring, a welding circuit arranged for connection through stud and plate, manually operated means for releasing one of the latches to permit the ram to raise the stud from the plate, time controlled means acting in time with said manually operated releasing means for releasing the other latch to permit the ram to engage the stud with the plate, and means acting in time with movements of the ram for closing the welding circuit before the stud is raised from the plate and opening the welding circuit before the stud is engaged with the plate.

19. In an apparatus for electrically welding a stud to a plate, a casing, a ram slidably mounted in said casing and having means thereon for holding the stud against the plate, a pair of spaced push rings slidable in the casing and operatively connected to move the ram, a spring compressed between the push rings, a latch associated with each push ring for controlling its spring pressed movement, a welding circuit arranged for connection through stud and plate, manually operated means for releasing one of the latches to permit the ram to raise the stud from the plate, time controlled means acting in time with said manually operated releasing means for releasing the other latch to permit the ram to engage the stud with the plate, and means acting in time with movements of the ram for closing and then opening the welding circuit.

20. In an apparatus for electrically welding a stud to a plate, a casing, a ram slidably mounted in said casing and having means thereon for holding the stud against the plate, a pair of spaced push rings slidable in the casing and operatively connected to move the ram, a spring compressed between the push rings, a latch associated with each push ring for controlling its spring pressed movement, a welding circuit arranged for connection through stud and plate, manually operated means for releasing one of the latches to permit the ram to raise the stud from the plate, a solenoid and circuit for releasing the other latch, and means timed from the operation of the manually operated releasing means for closing the solenoid circuit to permit the ram to engage the stud with the plate, and time controlled means initiated by the manually operated means for closing and opening the welding circuit in correlation with the movements of the ram.

21. In an apparatus for electrically welding a stud to a plate, a casing having a foot thereon for supporting the apparatus, a ram slidably mounted in said casing and having means thereon for holding the stud against the plate, means for adjusting the foot on the casing to vary the position of the ram with relation to the plate, a spring for moving the ram in either direction, a pair of latches for restraining the action of the spring, means for releasing one of the latches to permit the spring to move the ram away from the plate, and time controlled means initiated by the releasing means for releasing the other latch to permit the spring to move the ram toward the plate.

22. In an apparatus for electrically welding a stud to a plate, a casing, a ram slidably mounted in said casing and having means thereon for holding the stud against the plate, a spring for moving the ram in either direction, a pair of latches for restraining the action of the spring, a welding circuit arranged for connection through stud and plate, manually operated means for releasing one of the latches to permit the spring to move the ram to raise the stud from the plate, time controlled means acting in time with said manually operated releasing means for releasing the other latch to permit the spring to move the ram to seat the stud on the plate, means initiated by said manually operated means for closing and opening the welding circuit in correlation with the movements of the ram, and means for preventing closing of the welding circuit when the last named latch is in released position.

23. In a welding apparatus for welding a stud to a plate through an apertured covering, a welding head including means for holding the stud, a support releasably connected to the welding head and including a hand grip and also a foot on which the apparatus rests upon the covering, and manually operable release means adjacent the hand grip for adapting the welding head and the support to correct their relative positions under the pull of gravity when the stud in the welding head and the support are placed on said plate and covering.

EDWARD F. NELSON.